United States Patent

Youtsey et al.

[15] 3,651,386

[45] Mar. 21, 1972

[54] PYROPOLYMERIC SEMICONDUCTING ORGANIC-REFRACTORY OXIDE MATERIAL

[72] Inventors: Karl J. Youtsey, Chicago; William C. Holt, Jr., Arlington Heights; Robert D. Carnahan, Barrington; David H. Spielberg, Wheeling, all of Ill.

[73] Assignee: Universal Oil Products Company, Des Plaines, Ill.

[22] Filed: Aug. 24, 1970

[21] Appl. No.: 66,521

[52] U.S. Cl. ............................317/237, 317/234, 252/62.3, 136/89

[51] Int. Cl. ............................H01l 3/24

[58] Field of Search ............................317/237, 230; 252/623; 117/200, 201, 215; 29/576

[56] References Cited

UNITED STATES PATENTS

| | | | |
|---|---|---|---|
| Re27,117 | 4/1971 | Byrne et al. | 317/235 |
| 3,020,132 | 2/1962 | Gunther-Mohr | 317/237 X |
| 3,249,830 | 5/1966 | Adany | 317/234 |
| 3,274,034 | 9/1966 | Frant et al. | 148/33 |
| 3,530,007 | 9/1970 | Golubovic | 136/89 |
| 3,575,889 | 4/1971 | Klopffer et al. | 317/235 X |

*Primary Examiner*—James D. Kallam
*Attorney*—James R. Hoatson, Jr. and Philip T. Liggett

[57] ABSTRACT

A semiconducting material comprising a carbonaceous pyropolymer formed on a refractory oxide having a surface area of from about 1 to about 500 square meters per gram. A refractory oxide is heated to at least about 400° C. in an atmosphere containing an organic pyrolyzable substance. The semiconducting material has a conductivity at room temperature of from about $10^{-8}$ to about $10^{0}$ inverse ohm-centimeters, and is used for electrical applications such as heterojunction transistors, field-effect transistors, thermoelements in thermoelectric generators and refrigerators and temperature sensing devices, and electrodes in electrochemical cells, charge and energy storage devices, memory devices, inductive elements, and a variety of other electrical applications.

17 Claims, 3 Drawing Figures

INVENTORS:
Karl J. Youtsey
William C. Holt, Jr.
Robert D. Carnahan
David H. Spielberg
BY: James R. Hoatson, Jr.
Philip T. Liggett
ATTORNEYS

PYROPOLYMERIC SEMICONDUCTING ORGANIC-REFRACTORY OXIDE MATERIAL

This invention relates to a semiconducting material comprising a carbonaceous pyropolymer formed on a refractory oxide having a surface area of from about 1 to about 500 square meters per gram. More particularly, the refractory oxide is heated to at least about 400° C. in an atmosphere containing an organic pyrolyzable substance. The semiconducting material has a conductivity at room temperature of from about $10^{-8}$ to about $10^{0}$ inverse ohm-centimeters, and is used for electrical applications such as heterojunction transistors, field-effect transistors, thermoelements in thermoelectric generators and refrigerators and temperature sensing devices, and electrodes in electrochemical cells, charge and energy storage devices, memory devices, inductive elements, and a variety of other electrical applications.

It is known that hydrocarbons may be pyrolyzed to yield pyropolymers having various compositions. Pyrolysis is characterized by heating a substance in the absence of oxygen in order to achieve a change in molecular structure. If pyrolysis of an organic pyrolyzable substance is carried to the extreme degree, graphitic carbon will result. It has not heretofore been known, however, that heating a hydrocarbon or other organic pyrolyzable substance in the presence of an inorganic refractory oxide of high surface area will result in a material that is semiconducting at room temperature. This semiconducting material results from the formation of at least a monolayer of highly carbonaceous pyropolymers on the refractory oxide, and is the subject matter of this invention.

It is an object of this invention to economically produce a semiconducting material that may serve as an alternative to conventional materials in a number of semiconducting devices. Such applications include heterojunction transistors, field-effect transistors, thermoelements in thermoelectric generators and refrigerators and temperature sensing devices, electrodes in electrochemical cells, charge and energy storage devices, memory devices, inductive elements, and a variety of other electrical applications.

The electrical conductivity of a material must fall into one of three categories: conductors, semiconductors, or insulators. Conductors are those materials generally recognized to have a conductivity greater than about $10^{2}$ inverse ohm-centimeters, while insulators have a conductivity no greater than about $10^{-10}$ inverse ohm-centimeters. Materials having a conductivity within these limits are considered to be semiconducting materials. The semiconducting material of this invention is designed to supplement existing semiconducting materials having a conductivity of from about $10^{-8}$ to about $10^{0}$ inverse ohm-centimeters in many applications.

Another object of the invention is to provide a manner of making semiconductor materials using base materials that are inexpensive and available in abundant supply. Furthermore, the production of the semiconducting material of this invention requires only simple heating of the base materials together to produce the inventive composition of matter described herein.

Another object is to produce a semiconducting material which can be manufactured from a wide variety of base or source materials. The considerable number of suitable alternative materials insures a consistently inexpensive supply of base materials without the danger of costly shortages in any particular component material. While conductivity within the range desired may be produced from a wide variety of base materials, specific conductivity and other electrical properties can be varied in a controlled manner to a large extent by pretreatment of the refractory oxide, by regulation of the pyrolyzing temperature, regulation of the length of time during which the basic components are heated, and by appropriate selection of the organic pyrolyzable substance used in this invention. In addition, the temperature required to produce the semiconducting material of this invention can be lowered considerably by pretreatment of the refractory oxide prior to contact with the organic pyrolyzable substance.

In one broad aspect, this invention is a semiconducting material comprising a carbonaceous pyropolymer formed in at least a monolayer on a refractory oxide having a surface area of from about 1 to about 500 square meters per gram and having a conductivity at room temperature of from about $10^{-8}$ to about $10^{0}$ inverse ohm-centimeters. Heretofore, certain inorganic refractory oxides have been rendered semiconducting at elevated temperatures, but the semiconducting properties of these materials are lose once the temperature is lowered because of their characteristic large activation energy for conduction.

The accompanying drawings illustrate the preparation of the semiconducting material of this invention.

Figure 1:
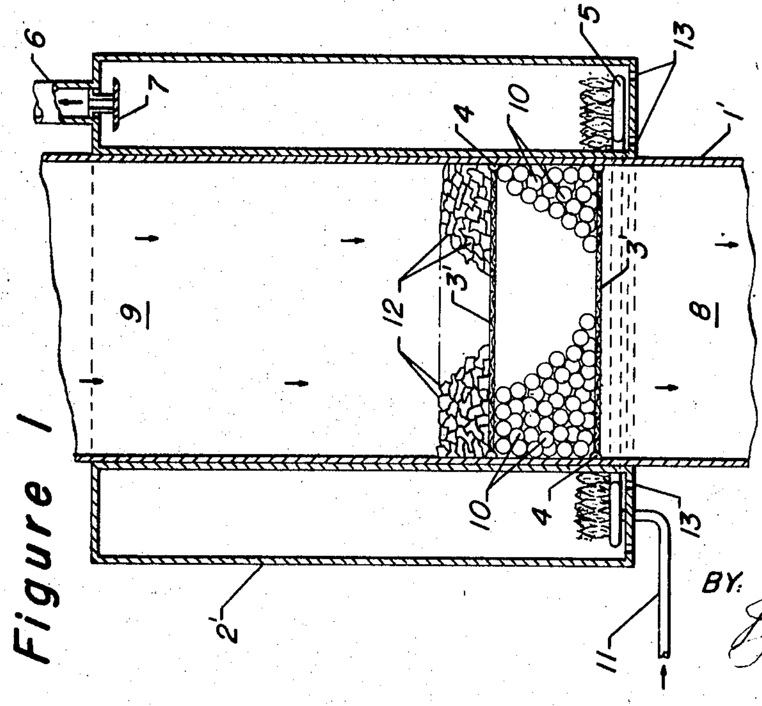
FIG. 1 is an elevational, sectional view of apparatus used to produce the semiconducting material of this invention.

Referring now to FIG. 1, there is shown a quartz vessel 1' within which a bed of refractory oxide spheres 10 is positioned. While the refractory oxide of FIG. 1 is illustrated in the form of spheres 10, the refractory oxide may be utilized in virtually any form. Some of the many forms of refractory oxide which may be rendered semiconducting include loose or compacted dry powders, cast or calcined sols, heated sols, sprayed substrates, oxidized aluminum pigment paint, insulating substrates in the form of flats, cylinders, and spheres, catalyst spheres, catalyst rods, catalyst pellets, conductors with refractory oxide coatings (sometimes taking the form of coated wires), insulators with refractory oxide coatings (such as fibers), and a wide variety of other geometrical configurations. The only limitation on the geometry of the refractory oxide is that it must be characterized as having a surface area of from 1 to 500 square meters per gram as previously described.

Virtually any porous refractory oxide is suitable as a basic component of the semiconducting material of this invention. Some of the refractory oxides which have been successfully used to form the semiconducting material of this invention include alumina ($Al_2O_3$), especially gamma-alumina, and silica-alumina ($Al_2O_3$–$SiO_2$).

A multiplicity of the refractory oxide spheres 10 used as a basic component for the semiconducting material of this invention are held in a bed extending laterally across the quartz vessel 1' between two screens 3'. Both of the screens 3' are circumscribed by circular rims 4 which hold the screens 3' in position against the walls of quartz vessel 1'. A gas furnace 2' is positioned around quartz vessel 1' so as to heat the spheres 10 and the incoming feed upstream from the bed of refractory oxide spheres. The gas furnace 2' is positioned to form a jacket around the quartz vessel 1'. An annular gas burner ring 5 with a gas inlet 11 is positioned in the lower portion of gas furnace 2'. An exhaust port 6 allows the products of combustion to leave the gas furnace 2', while air inlets 13 supply oxygen to the burner ring 5. A baffle 7 is positioned across exhaust port 6 so that as much heat as possible is conducted inward to the quartz vessel 1'. Quartz chips 12 are positioned in the quartz vessel 1' atop the upper screen 3'. The quartz chips 12 act as a feed preheater in the vessel 1'. The gas furnace 2' is capable of producing a temperature of 1,000° C. at the interior of the refractory oxide bed.

In the production of the semiconducting material a feed stream containing a pyrolyzable substance and a carrier gas is passed downward through the refractory oxide bed from an upstream inlet 9. The organic pyrolyzable substance reacts with the refractory oxide spheres 10, laying down a carbonaceous pyropoylmer thereon. The vaporized products of the reaction pass out of the quartz vessel 1' through a downstream outlet 8. The carrier gas used to carry the organic pyrolyzable substance may be any inert or reducing gas such as nitrogen or hydrogen but may not be an oxidizing gas such as oxygen.

The chemical and electrical alteration of the base or source components in the production of the semiconducting material of this invention may be explained as follows. In a method of producing a semiconducting material, another central aspect of this invention, an organic pyrolyzable substance is cracked, reformed, or polymerized upon contact with the refractory oxide at an elevated temperature. The minimum temperature necessary is about 500° C. where only a refractory oxide is used and about 400° C. where the refractory oxide is preimpregnated with a catalytic metallic substance. Such substances include all metals and mixtures of metals but especially the conventional hydrocarbon cracking catalytic metals such as platinum; platinum and rhenium; platinum and germanium; platinum and tin; platinum and lead; nickel and rhenium; tin; lead; germanium, etc. Whether or not catalytic metallic substances are preimpregnated into the refractory oxide, the refractory oxide is preferably heated to at least about 600° C. and preferably not above about 700° C. to produce the semiconducting material of this invention. One very effective operating temperature is about 625° C.

The feed organic yields both volatile and nonvolatile products. When the organic pyrolyzable substance is cyclohexane, for example, the major volatile product is usually benzene. Whatever the pyrolyzable substance, the nonvolatile products remain on the hot refractory oxide as carbonaceous pyropolymers. The carbon percent of the pyropolymers by weight ranges from less than 9 percent to greater than 34 percent. The initial attack of the pyrolyzable substance is with active sites on the alumina surface.

The electrical conductivity of the refractory oxide and condensed pyropolymers is effected in three stages. In the first stage, the surface species of the refractory oxide react with the pyrolyzable substance to form acceptor-donor charge transfer complexes. The conductivity of the semiconductor material at this stage will depend on the ionization potential of the donor and the electron affinity of the acceptor, as well as on changes in polarization energy due to electron rearrangements. The conductivity increases markedly over a short period of time (less than 30 seconds) in this first phase of conductivity increase, as denoted by the region 1 in the graph of FIG. 2. Within the region 1 the room temperature conductivity is still in the insulating range (less than $10^{-10}$ inverse ohm-centimeters). However, at the termination of region 1 the room temperature conductivity is within the semiconducting range. That is, if after some critical treatment time the sample were allowed to cool to room temperature, its conductivity would not return to its original low value, but would remain permanently increased. It is at this point in time that the refractory oxide is coated with at least a monolayer of carbonaceous pyropolymers. It is interesting to note that the sample becomes quite black after it has become permanently conducting. This is in contrast to the initial white or light color of refractory oxides. The black color alone, however, does not denote a pyropolymer monolayer on the refractory oxide.

Figure 2:
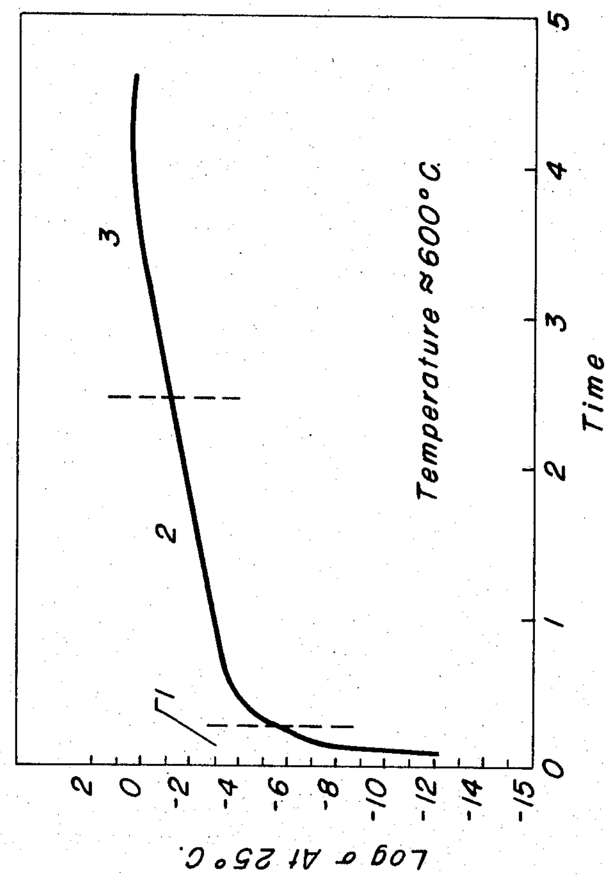
FIG. 2 is a graph of the correlation between conductivity and length of time heating the material.

The critical treatment time when the sample becomes semiconducting at room temperature marks the onset of region 2 as denoted in FIG. 2. This region is characterized by a relatively slower growth in the semi-conductivity, which further increases gradually two or three orders of magnitude. The color of the sample remains black.

While the increased conductivity of the material in region 1 is due to charge-transfer complexes, the increase in conductivity in region 2 results from an increase in the size of the pyropolymers with an accompanying increase in the number of conjugated double bonds. When the size of a set of conjugated double bonds in the pyropolymer on the refractory oxide becomes larger than some number (about 10 to 15 double-bond pairs), then the pyropolymer molecule acquires unusual characteristics. The energy required for the formation of excited electron states in the molecule becomes so low that the population of electrons in excited states in thermodynamic equilibrium becomes appreciable at room temperature. This low ionization energy characteristic is dependent on the degree of conjugation in the bonds of the carbonaceous pyropolymers. The number of conjugated double bonds in the pyropolymer formed on the refractory oxide of this invention increases continuously as the refractory oxide is exposed to the organic pyrolyzable substance over a longer period of time until a critical size in the pyropolymer is reached. This particular limiting size is dependent on the choices of pyrolyzable substance, treatment temperature, and ambient gas. Generally, the electrical conductivity of an organic solid rises as the degree of unsaturation increases. If unsaturation extends throughout the length of the material, the conductivity of the material is generally high. Ionization energy drops as the degree of unsaturation increases because the electrons are no longer confined to any particular location. As the ionization energy decreases, more and more electrons become available for conduction. This increases the conductivity of the coated refractory oxide material. As the pyropolymers increase in size, the molecules become large enough for a good deal of long range order to develop. The ratio of hydrogen to carbon atoms in pyropolymers resulting from hydrocarbonaceous pyrolyzable substances also decreases due to the decrease in the ratio of peripheral carbons to interior carbons as the molecular size increases. This results in increased molecular orbital overlap and a lowering of the intermolecular potential barriers to charge transport with a consequent increase in the mobility of charge carriers. This condition of the material is represented by the region 3 of FIG. 2. Within region 3 the intermolecular potential barrier to charge transport is significantly reduced, resulting in a further increase in conductivity. Within region 3, the material will turn a relatively shiny, metallic gray. The conductivity within this region will have increased one or two orders of magnitude from the conductivity of region 2. The shiny gray appearance and metallic type of conductivity characterize the semiconducting material in the condition represented by region 3.

In summary then, the sharp initial rise in conductivity of the coated refractory oxide is likely due to carbonium ions reacting with the surface species to form thermally activated mobile charges. Formation of these charge carriers establishes an increase in the charge carrier density and results in enhanced conductivity. The quick response upon contacting a hot refractory oxide with an organic pyrolyzable substance indicates that the early increased conductivity is not due to the presence of a large quantity of pyropolymers. It follows, then, that a monolayer of carbonaceous pyropolymer molecules is not deposited on the refractory oxide surface until the material reaches the transition to region 2. It is at the commencement of region 2 that the material first becomes semiconducting at room temperature. As the pyropolymers on the surface of the refractory oxide grow in size as well as number, free charge carriers are generated from within the pyropolymer molecules and persist even at room temperature. Continued heating in the presence of a pyrolyzable substance increases the number of free charge carriers, gradually increasing the electrical conductivity. As the material passes from region 2 to region 3, intermolecular potential barriers to charge transport are lowered and both the mobility and the number of charge carriers is increased. In developing a semiconducting material with a given refractory oxide the conditions and reacting organic pyrolyzable substance can be varied so that different types of polymers exhibiting a variety of properties are formed. Pyrolyzation in this invention differs from conventional pyrolyzation in requiring a refractory oxide as a basic component. The refractory oxide serves the dual role of catalyzing the formation of the semiconducting pyropolymer from the organic pyrolyzable substance and providing for the establishment of donor-acceptor charge-transfer complexes.

The semiconducting material of this invention differs from spent catalyst produced as an undesirable byproduct in hydrocarbon cracking and cracking of other organic compounds. For the same total carbon concentration, the conductivity of spent catalyst is considerably less than the conductivity of the semiconducting material produced in accordance with this invention. The reason for this is that the material of this invention has a considerably higher density of conjugated double bonds representing a substantially different structure. In conventional spent catalysts, conductivity rarely exceeds $10^{-8}$ inverse ohm-centimeters while conductivity of the semiconducting material of the present invention seldom falls below $10^{-8}$ inverse ohm-centimeters.

Another electrical property that may be affected by the manner in which the semiconducting material of this invention is produced is the conductivity type. It has been observed that treating the carbonaceous pyropolymers at different temperatures results in different conductivity types for the same base material. Preimpregnating the refractory oxide with the proper inorganic salt causes the conductivity type of the completed semiconducting material to be N-type, whereas reacting the refractory oxide alone with most organic pyrolyzable substances will result in a semiconducting material that has P-type conductivity. One exception to the general rule that P-type conductivity is achieved where a refractory oxide alone is used is in a case where the organic pyrolyzable substance is benzene at 750° C. A semiconducting material produced from the reaction of benzene and a refractory oxide at 750° C. will yield a semiconducting material that is N-type.

The semiconducting material of this invention may be used for many applications that existing semiconducting materials are now used. For example, one use is a semiconducting thermoelement for a thermoelectric generator comprising a carbonaceous pyropolymer formed in at least a monolayer on a refractory oxide having a surface area of from about 1 to 500 square meters per gram and having a conductivity at room temperature of from about $10^{-8}$ to about $10^{0}$ inverse ohm-centimeters and a thermoelectric power of at least about 7 millivolts per °C. and a thermal conductivity no greater than about $2.50 \times 10^{-4}$ gram calories per second - cm.$^2$- °C. per cm. The semiconducting property of the material of this invention is particularly useful in this application due to the nature of a thermoelement in a thermoelectric generator. A thermoelement is maintained with a temperature difference between its ends. This temperature difference creates an electromotive force or voltage between the ends of the thermoelement. The thermoelectric power produced varies from at least 7 millivolts per °C. to as high as 70 millivolts per °C. and is as great or greater than the thermoelectric power of existing metallic thermoelements currently used. However, the semiconducting material of this invention has the added advantage of low thermal conductivity. That is, the thermal conductivity is no greater than about $2.50 \times 10^{-4}$ gram calories per second - cm.$^2$ - °C. per cm. This facilitates the maintenance of a temperature difference between the ends of the thermoelement and thereby improves the efficiency of the thermoelectric generator.

Another utilization of the semiconducting material of this invention is as an electrode for an electrochemical cell. Such an electrode is comprised of a semiconducting material comprising a carbonaceous pyropolymer consisting of at least a monolayer on a refractory oxide having a surface area of from about 1 to about 500 square meters per gram and having a conductivity at room temperature of from about $10^{-8}$ to about $10^{0}$ inverse ohm-centimeters. One form of such an electrode is gamma-alumina reacted with cyclohexane. Before reaction with cyclohexane, the gamma-alumina is impregnated with a small concentration of platinum from chloroplatinic acid. The concentration of platinum in the alumina is about 0.1 percent by weight. The impregnated alumina is treated with an organic pyrolyzable substance such as cyclohexane, hexane, or pentane, at a temperature of from between about 400° C. and 600° C. The electrode formed from this material may be used as a cathode in a galvanic cell that is further comprised of a copper anode in an electrolyte of sulfuric acid and water. A steady galvanic potential of 0.37 volts exists between the electrode of this invention and the copper anode. Additional cells may be constructed using a variety of electrodes and electrolytes in combination with the semiconducting material of this invention. Steady, characteristic potentials are recorded in each case. The semiconducting cathode in each case has the unusual characteristic of high surface area which allows an easy adaptation of the electrode of this invention for use in inexpensive energy conversion cells with higher cathodic exchange currents than have heretofore been obtained. As an alternative to preimpregnating the electrode described with platinum, metallic combinations such as lead, germanium, tin, platinum and tin, or platinum and rhenium may also be used for the purpose of preimpregnation.

Figure 3:
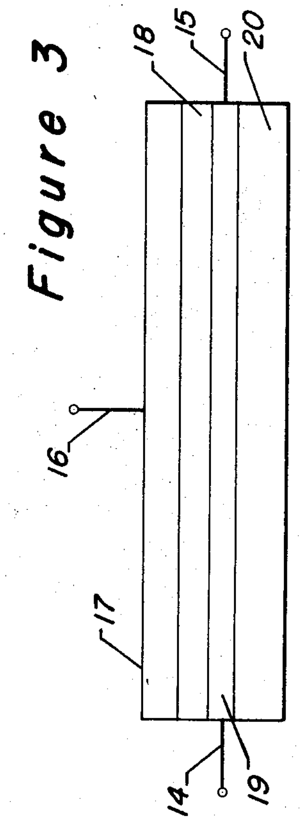
FIG. 3 is a magnified view of a field-effect transistor constructed according to this invention.

A further device in which the semiconducting material of this invention may be utilized is in a field-effect transistor constructed as in FIG. 3. A field-effect transistor so constructed may be comprised of a dielectric base 18 having opposite surfaces, a metal coating 17 on one of said surfaces, and a coating 19 of a semiconducting material in contact with the other of said surfaces. The coating 19 of this semiconducting material is comprised of a carbonaceous pyropolymer formed in at least a monolayer on a refractory oxide having a surface area of from about 1 to about 500 square meters per gram and having a conductivity at room temperature of from about $10^{-8}$ to about $10^{0}$ inverse ohm-centimeters. The semiconducting material is normally formed on an inert laminar support, such as the quartz sheet 20, and the dielectric base 18 is then laid over the semiconducting material 19. The dielectric material 18 is normally a conventional insulator constructed in a very thin sheet and having a high insulating capacity, such as Mylar (polyethylene terephthalate). The metallic coating 17 is then laid down on the opposite side of the dielectric material so that the metallic coating 17 and the semiconducting material 19 of this invention are positioned on opposite sides of the dielectric base 18 to form a capacitor. If an electric field of the proper polarity is placed across the dielectric by applying a voltage to the capacitor, the advantages of a field-effect device will be obtained. That is, a small fluctuation in voltage between the field electrode terminal 16 connected to the metal coating 17 and a first terminal 14 on the semiconducting material of this invention on the opposite surface of the dielectric base will render a disproportionately large fluctuation in current between the first terminal 14 and a second terminal 15 on the semiconducting material of this invention.

A physical property that may be imparted to the semiconducting material of this invention is a low coefficient of friction. This property is particularly useful in the construction of electrical switch contacts and motor and generator brushes. The combined characteristics of high conductivity and low friction are particularly valuable in these applications. This combination of characteristics may be imparted to the semiconducting material of this invention by compressing a powdered form of the conducting material of this invention with an inorganic dry lubricant. The conventional inorganic dry lubricants such as molybdenum disulfide and antimony oxide serve admirably for this purpose. A semiconducting material produced according to this invention and powdered and compressed with an inorganic dry lubricant is superior to carbon in that it exhibits improved wear characteristics under heavy load cycles.

Further applications of the semiconducting material of this invention will be apparent since the material may be made to be pyroelectric, ferroelectric, and piezoelectric. One particular form of the semiconducting material that is pyroelectric and ferroelectric is the semiconducting material produced from gamma-alumina preimpregnated with NaCl and reacted with cyclohexane. Some of the other forms of the semiconducting material of this invention are also pyroelectric and ferroelectric. Since the material is pyroelectric, its electrical conductivity will be a function of a changing temperature gradient across the semiconducting material of this invention.

Since the semiconducting material may be made ferroelectric, it exhibits spontaneous electric polarization, electric hysteresis, and piezoelectricity, that is, its electrical conductivity changes with variations in pressure exerted upon it. The ferroelectric properties of the semiconducting material may be utilized in computer memory applications where the state of hysteresis of the polarization-voltage curve is used to indicate a state of "on" or "off" in the computer memory. Also, certain forms of the semiconducting material of this invention can be made piezoelectric and may then be used in the form of a thin film integrated circuit inductive element. In those forms of the semiconducting material which are piezoelectric, the semiconducting material undergoes a change in conductivity when subjected to pressure. If the semiconducting material is placed in a series resonant circuit and operated above its resonant frequency, it will behave as an inductor.

One aspect of this invention is a method of making a semiconductor having a conductivity of from about $10^{-8}$ to about $10^{0}$ inverse ohm-centimeters from a refractory oxide having a surface area of from about 1 to about 500 square meters per gram and from an organic pyrolyzable substance comprising heating said refractory oxide to a temperature of from at least about 500° to about 1,000° C. in an atmosphere containing said organic pyrolyzable substance. Another method involved is the method of making a semiconducting material having a conductivity of from about $10^{-8}$ to about $10^{0}$ inverse ohm-centimeters from a refractory oxide having a surface area of from about 1 to about 500 square meters per gram impregnated with a catalytic metallic substance and from an organic pyrolyzable substance comprising heating said refractory oxide to a temperature of from at least 400° to about 1,000° C. in an atmosphere containing said organic pyrolyzable substance. The organic pyrolyzable substances most commonly and preferably used for the purposes of this invention are members of the group consisting of aliphatic hydrocarbons, aliphatic halogen derivatives, aliphatic oxygen derivatives, aliphatic sulfur derivatives, aliphatic niteogrn derivatives, organo-metallic compounds, alicyclic compounds, aromatic compounds, and heterocyclic compounds. Of the aliphatic hydrocarbons, the more common classes which may be utilized to perform this invention are alkanes, alkenes, alkynes, and alkadienes. Ethane, propane, butane, and pentane are among the alkanes that may be successfully used in the performance of this invention. Similarly, alkenes which suffice include ethene, propene, 1-butene, 2-butene, and 1-pentene. Alkynes which may be successfully used include ethyne, propyne, 1-butyne, 2-butyne, 1-pentyne, and 1-hexyne. 1,3-butadiene and isopropene are included among the alkadienes which may be utilized. Among the aliphatic halogen derivatives which suffice for the purposes of this invention are monoalkanes, polyhaloalkanes, and unsaturated halo compounds. In the monoalkane subgroup, chloromethane, bromoethane, 1-iodopropane, and 1-chlorobutane may be used. Polyhaloalkanes such as carbon tetrachloride, chloroform, 1,2-dichloroethane, and 1,2-dichlorobutane may also be utilized. One unsaturated halo compound which may be utilized is chloroprene.

The aliphatic oxygen derivatives appropriate for use in this invention include the classes of alcohols, ethers, halohydrins and alkene oxides, saturated aldehydes and ketones, unsaturated aldehydes and ketones, ketenes, acids, esthers, salts, and carbohydrates. Various alcohols which may be utilized include ethanol, 2-butanol, 1-propanol, glycol (e.g., 1,3-propanediol), and glycerol. Ethers utilized include ethyl ether, and isopropyl ether. Appropriate halohydrins and alkene oxides include ethylene chlorohydrin, propylene chlorohydrin, ethylene oxide, and propylene oxide. Suitable saturated aldehydes and ketones include formaldehyde, acetaldehyde, acetone, and ethyl methyl ketone. Unsaturated aldehydes and ketones which may be used include propenol, trans-2-butenal, and butenone. Ketene has also been successfully used as an organic pyrolyzable substance. Likewise, formic acid, acetic acid, oxalic acid, acrylic acid, chloroethanoic acid, formic anhydride, and formylchloride may also be utilized. Esthers such as methyl formate, ethyl formate, and ethyl acetate may also be used. Salts such as sodium formate, potassium acetate, and calcium propionate may be utilized as may a variety of carbohydrates. The broad classification of aliphatic sulfur derivatives may be broken down into the subclasses of alkanethiols, alkylthioalkanes, sulfonic acids, and alkyl sulfates and alkyl metallic sulfates. Suitable among the alkanethiols are ethyl mercaptan and n-propyl mercaptan. Among the alkylthioalkanes usable are the thioethers, alkyl sulfides, methyl sulfide, ethyl sulfide, and methyl propyl sulfide. Ethyl sulfonic acid and n-propyl sulfonic acid are sulfonic acids which also may be successfully used. Ethyl sulfate and sodium laurel sulfate are also appropriate for use.

The broad class of aliphatic nitrogen derivatives may be broken down into the subclasses of nitroalkanes, amides, amines, nitriles, and carbylamines. Nitroethane and 1-nitropropane are exemplary of suitable nitroalkanes while acetamide and propyioamide are among the appropriate amides. Amines such as dimethylamine and ethylmethylamine, nitriles such as acetonitrile and propionitrile, and carbylamines such as ethyl isocyanid may also be used for the organic pyrolyzable substance in this invention. Organometallic compounds such as tetraisopropyl titanate, tetrabutyl titanate, and 2-ethylhexyl titanate may also be used.

Particularly appropriate and preferred for use as the organic pyrolyzable substance of this invention are the alicyclic compounds. Foremost among these are cyclohexane and cyclohexene. Aromatic compounds include the subclasses of hydrocarbons, halogen compounds, oxygen derivatives, ethers, aldehydes, ketones, quinones, aromatic acids, aromatic sulfur derivatives, and aromatic nitrogen compounds may also be utilized. Among the many suitable hydrocarbons, benzene, naphthalene, anthracene, and toluene were successfully utilized. Benzyl chloride and benzal chloride are appropriate halogen compounds while phenol, o-cresol, benzyl alcohol, and hydroquinone are among the suitable derivatives. Ethers such as anisole and phenetole and aldehydes, ketones, and quinones, such as benzaldehyde, acetophenone, benzophenone, benzoquinone, and anthraquinone may also be used. Aromatic acids such as benzoic acid, phenylacetic acid, and hydrocinnamic acid may be utilized while the aromatic sulfur derivative of benzene sulfonic acid will also serve successfully. The aromatic nitrogen compounds of nitrobenzene, 1-d-nitronaphthalene, amino-benzene, and 2-amino toluene may also be successfully used as the organic pyrolyzable substance of this invention. Among the heterocyclic compounds, five member ring compounds such as furan, proline, coumarone, thionaphthene, indole, indigo, and carbazole may be successfully utilized. Six member ring compounds, such as pyran, coumarin, and acridine may also be utilized.

As can be seen, an extremely wide latitude can be exercised in the selection of the organic pyrolyzable substance, since virtually any organic material that can be vaporized, decomposed and polymerized on the refractory oxide by heating will suffice.

It has been found that the specific carbon concentration corresponding to a particular conductivity is a function of the pyrolyzable substance used to build the carbonaceous pyropolymer. For example, a carbon concentration of 31.7 percent in the pyropolymer produced from cyclohexane results in a conductivity of about $4 \times 10^{-3}$ inverse ohm-centimeters, while a carbon concentration of 21.1 percent in the pyropolymer produced from benzene results in a conductivity of about $4 \times 10^{-2}$ inverse ohm-centimeters. This indicates a difference in the pyropolymer structure as between the pyropolymers produced from different pyrolyzable substances. This difference is due to organic residues not included in the extended, conjugated, double-bond structure. Such a difference indicates that extraneous carbon structures may be eliminated from the pyropolymer by a proper choice of starting materials. One particularly advantageous choice is a mixture of benzene and o-xylene. Demethylation of the xylene to produce the benzyl radical or diradical promotes the formation of large aromatic polynuclear networks without extraneous, nonconjugated network elements by providing a large concentration of nucleation radicals. This results in an organic semiconducting material having a high conductivity with a relatively low carbon concentration. Similar results can be achieved using mixtures of o-xylene and naphthalene, o-xylene and anthracene, and halogenated or dihalogenated benzene and benzene, naphthalene, or anthracene.

The manufacture of the semiconducting material of this invention may be illustrated more fully by the accompanying example.

EXAMPLE 1

Twenty-five cubic centimeters of gamma-alumina were impregnated with a small concentration of platinum from chloroplantinic acid. The gamma-alumina was placed in the chloroplatinic acid and the chloroplatinic acid was evaporated leaving a deposit of about 0.75 percent platinum salt by weight on the gamma-alumina. The preimpregnated gamma-alumina was positioned in a reactor vessel similar to that of FIG. 1. The temperature of the reactor vessel was raised to 605° C. and the sample was reduced in 1 atmosphere of hydrogen for 2 hours. The carrier gas was then changed to nitrogen and cyclohexane was mixed with the carrier gas so that 0.4 cubic centimeter of cyclohexane for each cubic centimeter of preimpregnated gamma-alumina was passed through the reactor per hour. The effluent flow rate was between 30 and 35 cubic centimeters per minute. The effluent flow rate and temperature were maintained for a total of 20 hours. At this time the semiconducting material was removed from the reactor vessel and cooled.

The conductivity of the resulting product was between $10^{-2}$ and $10^{-3}$ inverse ohm-centimeters. The carbon concentration in the pyropolymer formed on the surface of the gamma-alumina was about 20.8 percent by weight.

EXAMPLE 2

The steps of Example 1 are repeated but pyridine is substituted for cyclohexane. In addition, the temperature of the reactor vessel is maintained at only 500° C., but the ratio of the volume of pyrolyzable material to the volume refractory oxide is increased to 7. The conductivity of the resulting semiconducting material is about $10^{-3}$ inverse ohm-centimeters.

EXAMPLE 3

The steps of Example 1 are repeated but n-pentane is substituted for cyclohexane and is passed through the gamma-alumina at a rate of 7 cubic centimeters of n-pentane for each cubic centimeter of impregnated gamma-alumina. The temperature of the reactor vessel is raised to 700° C., but the resulting semiconducting material is removed from the reactor and cooled after about 5 hours of exposure to the pyrolyzable material. The conductivity of the semiconducting material produced is about $10^{-2}$ inverse ohm-centimeters.

EXAMPLE 4

Small spheres composed of gamma-alumina are positioned in a reactor vessel such as that illustrated in FIG. 1. Benzene is used as the organic pyrolyzing substance and is injected into an inert carrier gas, nitrogen, so that 1 cubic centimeter of benzene for every cubic centimeter of gamma-alumina is passed through the reactor vessel per hour. The gamma-alumina is then heated to 600° C. The temperature and effluent flow rate are maintained for a total of 20 hours. Thereafter, the semiconducting material is removed from the reactor vessel, cooled, and its conductivity is measured at ambient room temperature. The conductivity of the semiconducting material produced is about 1 inverse ohm-centimeter. This compares to a conductivity of $10^{-16}$ inverse ohm-centimeters of untreated gamma-alumina at 25° C.

EXAMPLE 5

The steps of Example 4 are repeated with several variations. Cyclohexane is substituted for the benzene of Example 4 and the gamma-alumina is heated to a temperature of 750° C. The semiconducting material produced in this instance has a conductivity of about $10^{-1}$ inverse ohm-centimeters.

EXAMPLE 6

The steps of Example 5 are repeated with the exception that ethene is used in place of cyclohexane. The conductivity of the semiconducting material produced is comparable to that of Example 4.

EXAMPLE 7

The steps of Example 5 are repeated with the exception that carbon tetrachloride is used in place of cyclohexane. The conductivity of the resulting semiconducting material product is comparable to that of Example 4.

EXAMPLE 8

A quantity of gamma-alumina is preimpregnated with sodium chloride by washing the gamma-alumina in a salt solution. The gamma-alumina is removed from the solution and is calcined at a temperature of about 200° C. to drive off the excess water. The gamma-alumina is positioned in the reactor vessel of FIG. 1 and is exposed to cyclohexane in a helium carrier. The cyclohexane is passed over the gamma-alumina for about 30 hours at a temperature of 600° C. The resulting product is an n-type semiconducting material having a conductivity of about $10^{-4}$ inverse ohm-centimeters. In addition, this material exhibits the property of being strongly pyroelectric.

EXAMPLE 9

Small spheres composed of silica-alumina are positioned in the reactor vessel of FIG. 1. Cyclohexane is used as the organic pyrolyzing substance and is mixed to form an effluent with an inert carrier gas, nitrogen, so that 1 cubic centimeter of cyclohexane for every cubic centimeter of silica-alumina is passed through the reactor vessel per hour. The silica-alumina is heated to 650° C. The temperature and effluent flow rate are maintained for a total of 20 hours. Thereafter, the semiconducting material is removed from the reactor vessel, cooled, and its conductivity is measured at approximately $10^{-4}$ inverse ohm-centimeters.

EXAMPLE 10

The steps of Example 9 are repeated with the exception that ethanol is used in place of cyclohexane. The conductivity of the resulting semiconducting material produced is somewhat less than that of Example 8, but still greater than $10^{-8}$ inverse ohm-centimeters.

EXAMPLE 11

The steps of Example 10 are repeated with methyl propyl sulfide used in place of the ethanol.

EXAMPLE 12

A quantity of faujasite is placed in the reaction vessel of FIG. 1. A carbonaceous pyropolymer is formed on the faujasite and the resulting material is made semiconducting by exposing the faujasite to cyclohexane gas in a helium carrier at a rate of 1 cubic centimeter of cyclohexane for every cubic centimeter of faujasite at a temperature of 750° C. Exposure at this elevated temperature is maintained for about 20 hours. The semiconducting material produced has a conductivity of $10^{-5}$ inverse ohm-centimeters at 25° C.

The illustrations and descriptions contained herein have been given for clearness of understanding only, and no unnecessary limitations should be construed therefrom as other modifications will be obvious to those skilled in the field of semiconducting materials and in the field of treatment of high surface refractory oxides.

We claim as our invention:

1. In a semiconducting device, a semiconducting material therefor comprising a refractory oxide having a surface area of from about 1 to about 500 square meters per gram and a carbonaceous pyropolymer forming at least a monolayer on said refractory oxide, said semiconducting material having a conductivity at room temperature of from about $10^{-8}$ to about $10^{0}$ inverse ohm-centimeters.

2. The semiconducting material of claim 1 further characterized in that said refractory oxide is alumina.

3. The semiconducting material of claim 2 further characterized in that said refractory oxide is gamma-alumina.

4. The semiconducting material of claim 1 further characterized in that said refractory oxide is silica-alumina.

5. The semiconducting material of claim 1 further characterized in that said refractory oxide is preimpregnated with a metal.

6. The semiconducting material of claim 5 further characterized in that said metal is platinum.

7. The semiconducting material of claim 5 further characterized in that said refractory oxide is preimpregnated with a plurality of metals.

8. The semiconducting material of claim 7 wherein said metals are platinum and rhenium.

9. The semiconducting material of claim 7 wherein said metals are platinum and germanium.

10. The semiconducting material of claim 7 wherein said metals are platinum and tin.

11. The semiconducting material of claim 7 wherein said metals are platinum and lead.

12. The semiconducting material of claim 7 wherein said metals are platinum, nickel, and rhenium.

13. The semiconducting material of claim 1 further characterized in that said refractory oxide is preimpregnated with an inorganic salt.

14. The semiconducting material of claim 13 wherein said inorganic salt is sodium chloride.

15. The semiconducting material of claim 1 further characterized in that said refractory oxide is powdered and copressed with an inorganic dry lubricant.

16. The semiconducting material of claim 15 wherein said inorganic dry lubricant is molybdenum disulfide.

17. The semiconducting material of claim 16 wherein said inorganic dry lubricant is antimony oxide.

* * * * *